(12) United States Patent
Goziker et al.

(10) Patent No.: US 10,880,618 B2
(45) Date of Patent: Dec. 29, 2020

(54) PLUGGABLE INTERACTIVE TELEVISION

(71) Applicant: Rovi Technologies Corporation, Santa Clara, CA (US)

(72) Inventors: Edward Goziker, Redmond, WA (US); Toby Steele, Dublin (IE); Tim Zobel, Redmond, WA (US); Pavel Glozman, Bellevue, WA (US); Ross Hewit, Sammamish, WA (US)

(73) Assignee: Rovi Technologies Corporation, San Jose, CA (US)

( * ) Notice: Subject to any disclaimer, the term of this patent is extended or adjusted under 35 U.S.C. 154(b) by 0 days.

(21) Appl. No.: 14/948,843

(22) Filed: Nov. 23, 2015

(65) Prior Publication Data
US 2016/0150295 A1    May 26, 2016

Related U.S. Application Data

(60) Continuation of application No. 14/057,764, filed on Oct. 18, 2013, now Pat. No. 9,197,928, which is a
(Continued)

(51) Int. Cl.
*H04N 7/173* (2011.01)
*H04N 21/81* (2011.01)
(Continued)

(52) U.S. Cl.
CPC ......... *H04N 21/8166* (2013.01); *G09G 5/005* (2013.01); *H04N 21/426* (2013.01);
(Continued)

(58) Field of Classification Search
CPC ............. H04N 21/812; H04N 21/8173; H04N 21/235; H04N 21/435; H04L 67/02; H04L 67/34
See application file for complete search history.

(56) References Cited

U.S. PATENT DOCUMENTS

| 5,953,073 A | * | 9/1999 | Kozina | G06F 17/30784 |
| | | | | 348/558 |
| 6,240,555 B1 | * | 5/2001 | Shoff | H04N 5/44543 |
| | | | | 348/E5.104 |
| 2002/0016820 A1 | * | 2/2002 | Du Val | H04N 7/17318 |
| | | | | 709/203 |
| 2002/0016969 A1 | * | 2/2002 | Kimble | H04N 21/47202 |
| | | | | 725/87 |

(Continued)

OTHER PUBLICATIONS

Goziker et al., U.S. Appl. No. 14/057,764, filed Oct. 18, 2013.
Goziker et al., U.S. Appl. No. 12/202,562, filed Sep. 2, 2008.

*Primary Examiner* — Jason Salce
(74) *Attorney, Agent, or Firm* — Haley Guiliano LLP

(57) ABSTRACT

Techniques are disclosed herein that provide a TV receiver that supports a set of existing iTV standards and proprietary iTV implementations. Further, the TV receiver can be extended to support additional iTV standards and proprietary iTV implementations. A digital television data stream is received and processed by a client. The digital television data stream is analyzed to determine which interactive television format is present. A registry of interactive television virtual machines is searched to determine whether a virtual machine is registered for the interactive television format. Each of the interactive television virtual machines is adapted for one of the interactive television formats. If a virtual machine that matches the interactive television format is found, it is loaded and hosted. Hosting the virtual includes providing services to the virtual machine through common application programming interfaces (APIs) machine includes. The common APIs may be used by any virtual machine that is loaded.

16 Claims, 9 Drawing Sheets

Related U.S. Application Data division of application No. 12/202,562, filed on Sep. 2, 2008, now Pat. No. 8,566,869.

(51) Int. Cl.
*H04N 21/84* (2011.01)
*G09G 5/00* (2006.01)
*H04N 21/426* (2011.01)
*H04N 21/435* (2011.01)
*H04N 21/443* (2011.01)

(52) U.S. Cl.
CPC ... *H04N 21/42615* (2013.01); *H04N 21/4355* (2013.01); *H04N 21/4437* (2013.01); *H04N 21/8173* (2013.01); *H04N 21/8193* (2013.01); *H04N 21/84* (2013.01); *G09G 2370/022* (2013.01); *G09G 2370/042* (2013.01); *G09G 2370/22* (2013.01)

(56) References Cited

U.S. PATENT DOCUMENTS

| | | | |
|---|---|---|---|
| 2002/0194618 A1* | 12/2002 | Okada | G11B 27/105 725/132 |
| 2003/0011749 A1* | 1/2003 | Kawakami | H04N 21/433 352/244 |
| 2004/0064504 A1* | 4/2004 | Domschitz | A63F 13/12 709/203 |
| 2005/0172310 A1* | 8/2005 | Kwon | H04H 20/16 725/9 |
| 2006/0095952 A1* | 5/2006 | Chung | H04N 21/235 725/136 |
| 2006/0174304 A1* | 8/2006 | Kim | H04L 12/40091 725/116 |
| 2008/0141317 A1* | 6/2008 | Radloff | H04N 5/44582 725/87 |

* cited by examiner

PLUGGABLE INTERACTIVE TELEVISION

PRIORITY

This is a continuation application of U.S. patent application Ser. No. 14/057,764, entitled "Pluggable Interactive Television," by Goziker et al., filed Oct. 18, 2013, currently pending, which is a divisional application of U.S. patent application Ser. No. 12/202,562, entitled "Pluggable Interactive Television," by Goziker et al., filed Sep. 2, 2008, now U.S. Pat. No. 8,566,869, each of which is incorporated herein by reference in its respective entirety.

BACKGROUND

In addition to video and audio data, broadcast media streams may contain data for interactive television (iTV). One example of iTV is delivering movies or other programming to a specific user "on demand," in which case the user does not affect the content. In this example, there is no return path to the broadcaster. For example, once the movie is downloaded all control over the movie presentation may be on a user's set top box (STB). As another example, the users affect the iTV programming such as by real-time voting. In this example, audience members cast votes to create decisions that are reflected in how the show continues. Note that in this latter example, there is a return path from the users to the program provider. Still another example of iTV is using part of the broadcast media stream to deliver games to a user. For example, one part of the broadcast media stream contains more conventional non-interactive content, whereas another part contains an interactive game. There is virtually no limit to the possibilities of interactive TV; therefore, the foregoing should be understood to be non-limiting examples.

More and more broadcasters are choosing to adopt iTV. Some countries even require that broadcasters provide iTV support. However, there exists a wide variety of iTV standards such as Multimedia and Hypermedia Experts Group (MHEG), Broadcast Markup Language (BML), Multimedia Home Platform (MHP), and OpenCable Application Platform (OCAP). Furthermore, a broadcaster may use a proprietary iTV implementation rather than an established standard.

Many iTV standards define the interface for a virtual machine (VM). In general, a VM is software that can be thought of as an implementation of a machine (e.g., computer) that executes software applications like a real machine. A goal of a VM is to allow applications to interact with the VM independent of the actual hardware and operating system. A given iTV standard may define how an iTV VM for that iTV standard should behave, what inputs to accept, how to react to the input, and what APIs to provide to applications that interface with the iTV VM. As one example, with respect to MHEG-5, the International Organization for Standardization (ISO) provides the document, "Coding of Multimedia and Hypermedia Information—Part 5, Support for Base-level Interactive Applications" (ISO/IEC 13522-5). As another example, BML is governed by ARIB (Association of Radio Industries and Businesses) standard body, which provides the "Data Coding and Transmission Specification for Digital Broadcasting Standard (ARIB STD-B24).

As suggested by the foregoing, the user's receiver may have one or more applications that provide programming services, such as electronic program guides (EPG) that need to interface with the iTV VM. Because the interface for an iTV VM for a given type of iTV is standardized, the same software application can interface a given type of iTV VM. For example, an EPG application should be able to interface with an iTV VM that complies with MHEG regardless of what computing platform and operating system is in use. However, typically the same application cannot interface with iTV VMs that comply with different standards. For example, the interface to an MHP iTV VM may be substantially different from the interface to an MHEG iTV VM, thus the same EPG application may be unable to interface with both.

Thus, a problem is designing a TV receiver that will support a set of existing iTV standards and can be extended to support additional iTV standards.

SUMMARY

Techniques are disclosed herein that provide a TV receiver that supports a set of existing iTV standards and proprietary iTV implementations. Further, the TV receiver can easily be extended to support additional iTV standards and proprietary iTV implementations. In some implementations, a plug-in architecture allows extension of the iTV standards that the TV receiver supports. One type of plug-in detects whether a data stream contains a signal that is compliant with a particular iTV standard. Another plug-in extracts metadata for the particular iTV standard from the data stream.

In one aspect, a digital television data stream is received and processed by a client. The digital television data stream is capable of transporting different interactive television formats. The digital television data stream is analyzed to determine which of the interactive television formats is present. A registry of interactive television virtual machines is searched to determine whether a virtual machine is registered for the interactive television format. Each of the interactive television virtual machines is adapted for one of the interactive television formats. If a virtual machine that matches the interactive television format is found, it is loaded and hosted.

In one implementation, hosting the virtual machine includes providing services to the virtual machine through common application programming interfaces (APIs). The common APIs may be used by any virtual machine that is loaded. By providing a set of common APIs that may be used by iTV virtual machines for different iTV standards, the TV receiver can easily be extended to support additional iTV standards.

Another implementation is a computer readable medium having stored thereon a set of instructions and data structures for implementing a television receiver. The instructions which when executed on a processor implement a platform that provides services for iTV virtual machines. The virtual machines correspond to different formats (e.g., standards) of interactive television. A registry lists the virtual machines that are available to the platform. Examples of services provided by the platform are an EPG, data delivery, graphics, etc. The computer readable medium has application program interfaces (APIs) that are provided to the virtual machines to access to services. The platform receives a digital television data stream and analyzes the data stream to determine what format of interactive television data is present in the data stream. The platform searches the registry for a virtual machine that matches the interactive television format. The platform loads the virtual machine that matches the interactive television format. The platform makes the APIs available to the virtual machine that matches the interactive television format.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
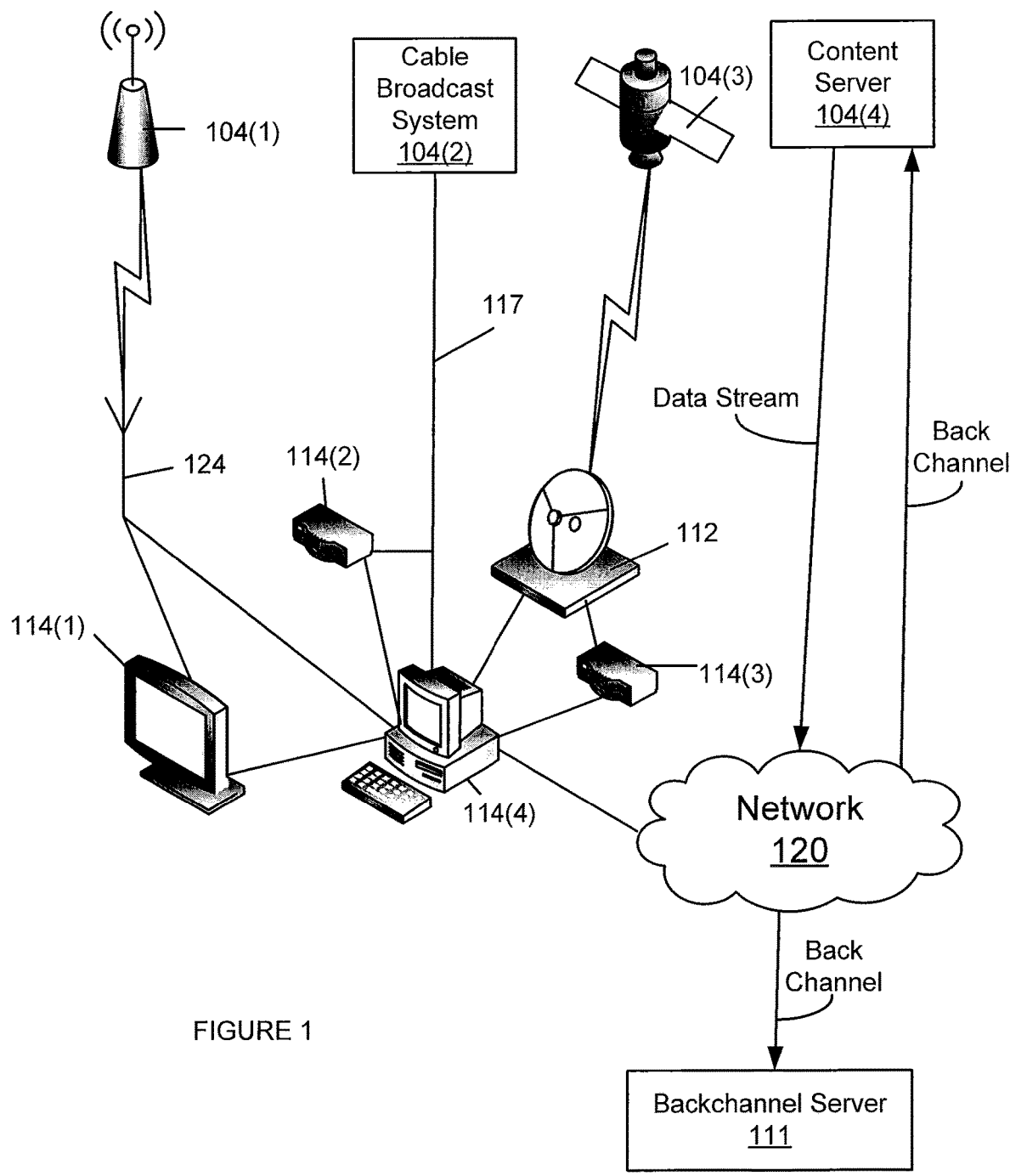
FIG. 1 illustrates an exemplary entertainment system in which various embodiments described herein can be implemented.

FIG. 1 illustrates an exemplary environment in which interactive television is provided to a client. The local television antenna 104(1) may be used to transmit a signal from a local television (or radio) station. The cable broadcast system 104(2) provides content from a cable television provider. The satellite 104(3) provides a signal from a satellite television provider. The content server 104(4) provides a signal from an Internet television provider. FIG. 1 presents only a few example program sources 104. In addition to audio/visual content, the signals transmitted by the program sources 104 may have interactive television content. Numerous standards for transmitting interactive television content exist. Moreover, interactive television may be provided in a proprietary format. The audio visual content could be television programs, movies, commercials, music, and similar audio and/or video content. Thus, the signals from the program sources 104 are not limited to television programs.

Client devices 114 can be implemented in a number of ways. For example, client device 114(1) is connected to an antenna 124 to receive interactive program content from a local television station. In this example, client device 114(1) is a television set, which can receive content from other clients 114(2)-114(4). Client 114(1) may have a direct connection to clients 114(2) and 114(3) to receive the program content; however, those connections have not been depicted in FIG. 1 so as to not obscure the diagram.

Client device 114(2) is connected to a cable network 117 to receive program content from a cable system 104(2). Client device 114(2) is also referred to as a set-top box. Client device 114(3) is coupled to a satellite dish 112 to receive program content from the satellite 104(3). Client device 114(3) may also be referred to as a set-top box or a satellite-receiving device. Client device 114(4) is connected to a network 120 (e.g., the Internet) to receive program content from the content server 104(4). For example, the client 114(4) may receive Internet Protocol Television (IPTV). Numerous vendors provide software programs for receiving Internet Television. An example of such a software product is the Microsoft® Mediaroom™ Internet Protocol Television (IPTV) software platform, which is commercially available from Microsoft Corporation of Redmond, Wash. The client device 114(4) can also receive program content from a network source that is not on the Internet. Client device 114(4) may also be referred to as a personal computer.

Note that the personal computer 114(4) can also be connected to other client devices 114(1)-114(3) to allow the personal computer 114(4) to receive program content from the tuners in the other devices 114(1)-114(3). For example, the personal computer 114(4) can be connected to either of the set top boxes 114(2), 114(3) to receive an output signal therefrom. The personal computer 114(4) executes software to process the signals output from clients 114(2) or 114(3) to play television programs, etc. on the personal computer 114(4). An example of such software is the Media Center™ entertainment center, which is commercially available from Microsoft Corporation of Redmond, Wash. Such software can also be used to play television content based on the output of the computer's tuner card. Thus, the personal computer 114(4) can receive and play program content from any of the sources 104(1)-104(4) through a tuner whether the tuner is hardware, software, or some combination of hardware and software.

In some implementations, a back channel is used to transmit information from the client 114 back to the program source, or another location, as a part of the interactive television experience. For example, a user might make a purchase in response to seeing a product of interest in an interactive shopping program. In one aspect the network 120 is used to implement the back channel. As one example, the personal computer 114(4) uses the Internet to send information to the content server 104(4), which is providing the interactive content. However, a back channel can also be used when receiving iTV from other content providers. For example, if the satellite 104(3) is providing the content to set top box 114(3), the set top box can interface with the personal computer 114(4) to access a back channel through the network. Note that in this case, a server other than content server 104(4) is likely to be accessed via the backchannel.

One or more client 114 devices in the system 100 have logic embedded therein for implementing interactive television on one or more of the clients 114. In one embodiment, to implement interactive television, one or more of the client devices 114 execute computer readable instructions that are stored on computer readable media. The client device 114(4) has a processor on which the instructions are executed. Computer readable media can be any available media that can be accessed by the client devices 114. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the computer readable instructions and which can accessed by the client device 114(4).

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

It is to be appreciated and understood that the exemplary system 100 constitutes but one exemplary operating environment. Accordingly, this description is not intended to limit application of the claimed subject matter to just this one type of operating environment. Rather, the principles described herein can be implemented in other similar or different environments without departing from the spirit and scope of the claimed subject matter.

Figure 2:
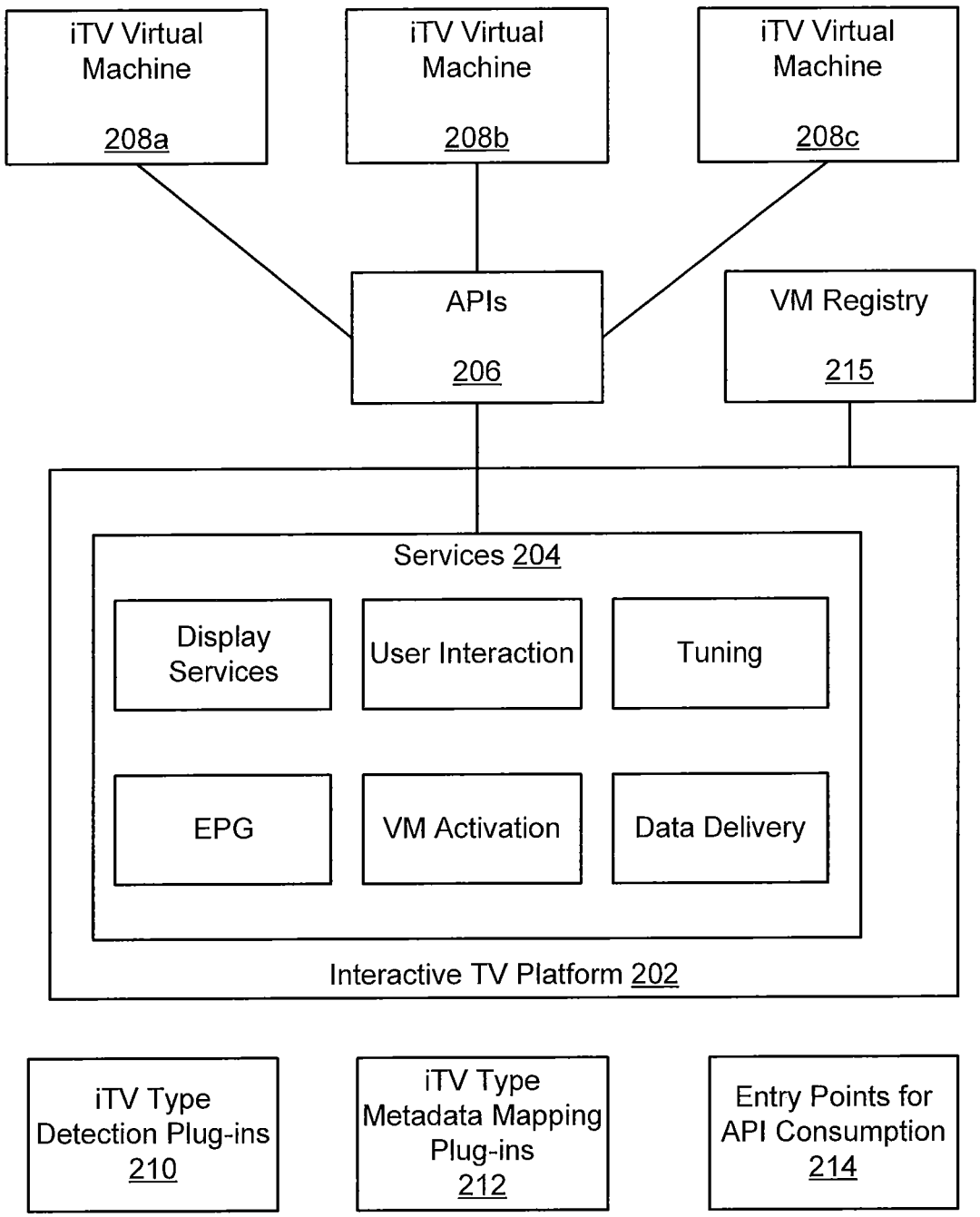
FIG. 2 illustrates one embodiment of an interactive TV platform.

FIG. 2 illustrates one embodiment of an interactive TV platform 202 and other software that may be implemented on one or more of the clients 114. The interactive TV platform 202 has a number of services 204 that are provided to the iTV VMs 208*a*-208*c* via a set of application programming interfaces (APIs) 206. An example of a service is a data delivery service that extracts data from the data stream and provides it to the iTV VM 208. Another example is an EPG.

Each virtual machine 208 is adapted to one particular type (e.g., format or standard) of interactive TV. The interface for the iTV VM 208 may be defined in a particular standard. By type of interactive TV it meant one particular standard or proprietary protocol. Examples of iTV standards include, but are not limited to, Multimedia and Hypermedia Experts Group (MHEG), Broadcast Markup Language (BML), Multimedia Home Platform (MHP), and OpenCable Application Platform (OCAP). However, the type of interactive TV is not limited to these standards. Moreover, the type of interactive TV is not limited to a published standard. Rather, the type of interactive TV can include a proprietary implementation. For example, a cable operator or Internet TV provider could develop its own implementation for providing interactive TV.

The iTV VM registry 215 contains a list of iTV VMs 208 that are available to the client 114. The available iTV VMs 208 may be stored on the client 114, but this is not a requirement. In one implementation, an iTV VM 208 that is listed in the iTV VM registry 215 as "available" is accessed remotely. For example, the client 114 may obtain the iTV VM 208 over an Internet connection. In one implementation, the platform 202 has a registration method that an iTV VM 208 may invoke to register itself. The iTV VM 208 may provide one or more plug-ins during the registration process. Thus, the platform 202 has access to the plug-ins.

In this example, two types of plug-ins are depicted. One is an iTV detection plug-in 210. The other is a metadata mapping plug-in 212. Each iTV detection plug-in 210 is able to determine whether a data stream contains a certain type of iTV. Each metadata mapping plug-in 212 assists in extracting metadata for a particular iTV type from the data stream and providing it to the appropriate ITV VM 208.

The use of the plug-ins is not a requirement. In one embodiment, the system is a "closed system" such that only "sanctioned" VMs are registered and loaded. In this example, the iTV detection and meta-data mapping could be done using a non-pluggable techniques (e.g., only a fixed set of VMs 208 could be detected and their data mapped), whilst the VMs 208 themselves could still use the generic API.

In addition to providing plug-ins during registration, information is exchanged between an iTV VM 208 and the iTV platform 202 that assists the iTV VM in obtaining access to the APIs 206. In general, the APIs 206 can be provided to the iTV VMs 208 by either a push or a pull technique. In one implementation, an iTV VM 208 provides to the iTV platform 202 one or more entry points for API consumption 214. In one implementation, an entry point defines managed assembly (e.g., dynamic linked libraries (DLL)) of an iTV VM 208 that supports the interfaces needed for the Interactive TV platform 202 to load this iTV VM 208 and provide the iTV VM with the Interactive TV Platform's 202 root interface. In one implementation, the entry points are entry points used in Microsoft Windows Media Center Software Development Kit (SDK). The SDK enables developers to customize certain features that are included with Windows Media Center software. The SDK provides documentation and sample code that developers can use to create software that extends Windows Media Center in various ways. In some implementations, the entry point is an "entrypoint" in extensibility SDK. However, it is not required that the entry point be an extensibility SDK. In one implementation, the iTV platform 202 provides the iTV VM 208 with information during the registration process that the iTV VM 208 later uses to access the APIs 206.

The interactive TV platform 202 provides a set of functionality to the iTV VMs 208. In one implementation, the functionality is grouped into a number of different services to the iTV VMs 208. The following are some examples of services that the interactive TV platform 202 may provide. However, note that it is not required that the functionality be grouped into the following services. The activation service is responsible for determining which iTV VM 208 to initialize. The activation service may make this determination based on the iTV type that is present in the digital broadcast stream. In one implementation, the iTV detection plug-ins 202 are used by the activation service.

The data delivery service is responsible for providing the particular iTV VM 208 with the iTV application data from the broadcast data stream for that iTV format. In one implementation, the metadata mapping plug-ins 212 are used by the data delivery service to extract the correct data from the broadcast data stream.

The user interaction service provides the iTV VM 208 with means to interact with the user. For example, this service allows an iTV VM 208 with the ability to receive remote control commands, keyboard input, text input, etc.

The tuning service allows the iTV VM 208 to tune to a specific channel and to obtain low level tuning channel information. Further details of an example interface for a tuning service are discussed below.

The guide service allows the iTV VM 208 to work with an electronic program guide (EPG). That is, this service allows the iTV VM 208 to display an EPG and receive input based on the displayed EPG.

The presentation service provides functionality related to various displays. For example, this service allows control over video display, audio presentation, closed captioning, etc. The presentation service may also have more advanced capabilities such as allowing the iTV VM to render objects on the display screen. For example, the iTV VM can create and display computer generated images.

The foregoing list of services is presented as an example. It is not required that these particular services be provided. Furthermore, many other types of services might be provided.

Figure 3A:
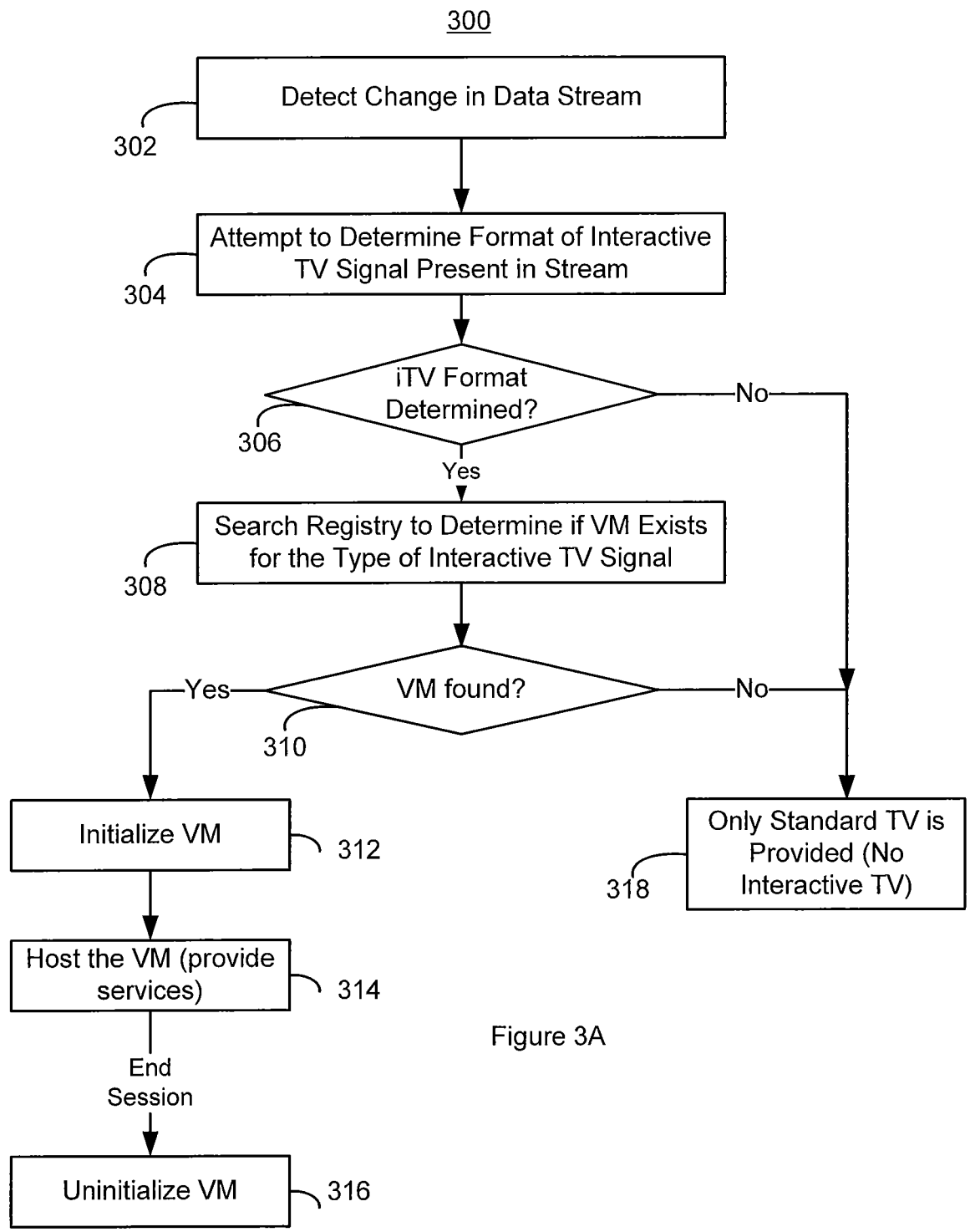
FIG. 3A depicts one embodiment of a process for loading a virtual machine.
Figure 3B:
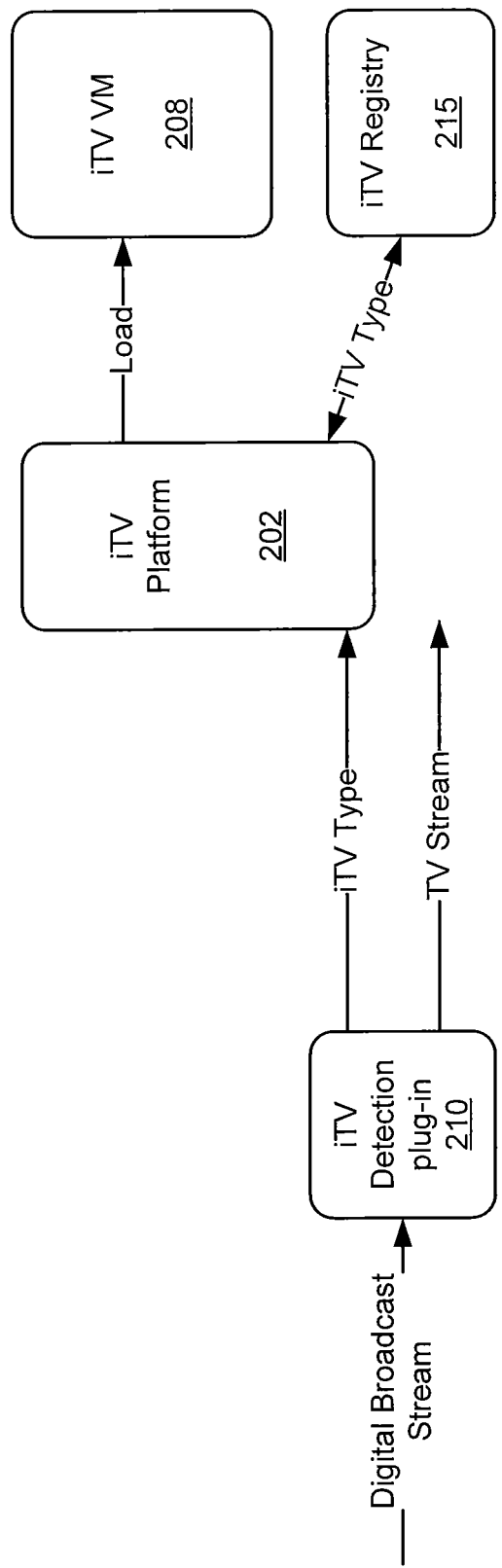
FIG. 3B depicts one embodiment of a software modules and data structures for loading a virtual machine.

FIG. 3A depicts one embodiment of a process 300 for loading an appropriate iTV VM 208 for the type of iTV data in the digital broadcast stream that is currently being received by the client 114. FIG. 3B depicts one embodiment of software modules and data structures for loading an iTV VM 208 based on the type of iTV. FIG. 3B will be referred to when discussing process 300 of FIG. 3A. Process 300 may be performed by software on the personal computer 114(4). However, any other client 114 could also perform process 300. In one aspect, process 300 is performed by the iTV platform 202.

In one implementation, process 300 is invoked at step 302 when the client 114 detects a change to a digital broadcast stream. In step 302, the client 114 detects a change to the digital broadcast stream. The change might be that the data stream is first being received, or that a channel was changed. However, the change to the stream could occur without a channel change. For example, a broadcaster that was not transmitting an iTV signal could start transmission. In one embodiment, such a change is detected by monitoring for changes in certain tables that are broadcast in the stream. Further details of program map tables (PMT) and the like that can be monitored to detect such changes are discussed below.

Referring to FIG. 3B, an iTV detection plug-in 210 on the client 114 receives the digital broadcast stream. The digital broadcast stream contains interactive TV and may also contain separate conventional TV audio/visual information. The digital broadcast stream may be an MPEG-2 stream, as an example. MPEG-2 is a standard for the generic coding of moving pictures and associated audio data. MPEG-2 defines a transport stream that is designed to carry digital video and audio over possibly lossy media, such as broadcasting. Typically, when using MPEG-2, the digital broadcast stream in FIG. 2 is the MPEG-2 transport stream, as the typical source of the digital broadcast stream is a broadcaster (e.g., FIG. 1, 104). However, in one implementation, the client 114 receives a digital data stream from a stored media, such as a DVD. MPEG-2 defines a program stream, which is a container format designed for reasonably reliable media such as optical disks and DVDs. In one implementation, the client 114 receives an MPEG-2 program stream. The digital data stream received by the client 114 is not limited to MPEG-2.

In step 304, the client 114 attempts to determine the format of iTV that is present in the digital broadcast stream. In one implementation, the client 114 invokes each of the iTV detection plug-ins 210 until one of the iTV detection plug-ins 210 detects the presence of an iTV signal. In one implementation, it is expected that there will only be one iTV signal in the digital broadcast stream. Thus, there is no need to invoke all of the iTV detection plug-ins 210 once an iTV signal is detected. However, in another implementation, there may be more than one type of iTV in the digital broadcast stream. In this case, each iTV detection plug-in 210 can be invoked regardless of whether an iTV signal has already been detected.

As previously mentioned, each iTV detection plug-in 210 is adapted to detect a particular type of iTV signal. Thus, the detection mechanism may be different for each iTV type, although there may be similarities for some iTV types. For example, for MHEG and BML, the iTV signal can be determined based on the presence of particular descriptors within a program map table (PMT) in the digital broadcast stream. As one example, in MPEG-2 the transport stream has a concept of programs. A single program is described by a PMT, which contains a list of streams in the digital broadcast stream. PMTs also provide metadata about the streams in their constituent program identifiers (PIDs). The iTV detection plug-in 210 provides the exact offsets in the PMT table and what descriptors to look for. As a particular example, a iTV detection plug-in 210 for an MHEG type of iTV may look for a "data_broadcast_id descriptor" in the PMT with appropriate details within a service's PMT. Note that something other than the PMT table might be used to determine the presence of other types of iTV.

If none of the iTV detection plug-ins 210 detects an iTV signal, then control passes to step 318. It may be that there is no iTV signal in the digital broadcast stream or that there is an iTV signal that is not currently supported by the client 114.

If the iTV format is determined then control passes to step 308 to determine whether there is an iTV VM 208 that corresponds to the iTV type. In one implementation, the iTV detection plug-in 210 passes an identifier of the iTV type to the iTV platform 202. The iTV platform 202 searches the iTV VM registry 215 in step 310 to determine if an iTV VM 208 is registered. If an iTV VM 208 is found in the registry 215, the iTV VM is initialized (loaded) in step 312. If an iTV VM 208 is not found in the registry, then control passes to step 318. That is, if no iTV VM 208 is found in the registry 215, then only normal TV is provided (i.e., iTV is not provided).

After initializing the iTV VM 208, the iTV VM 208 consumes the APIs 206 in order to make use of the services 204 provided by the iTV platform 202. For example, the iTV VM 208 begins to access iTV metadata from the digital broadcast stream. However, note that the mere fact that an iTV type was detected in the digital broadcast stream does not mean that there is data at this time. For example, even if it is determined that the MHEG type of iTV is present in the digital broadcast stream as indicated by the data_broadcast_id descriptor, the digital broadcast stream pointed to by the descriptor may not actually be carrying MHEG data at that moment.

The iTV VM 208 runs until the current TV session ends due to, for example, user action. In step 316, the iTV VM 208 is uninitialized. Note that multiple iTV VMs 208 can run concurrently if the data stream contains data for more than one type of iTV.

Figure 4:
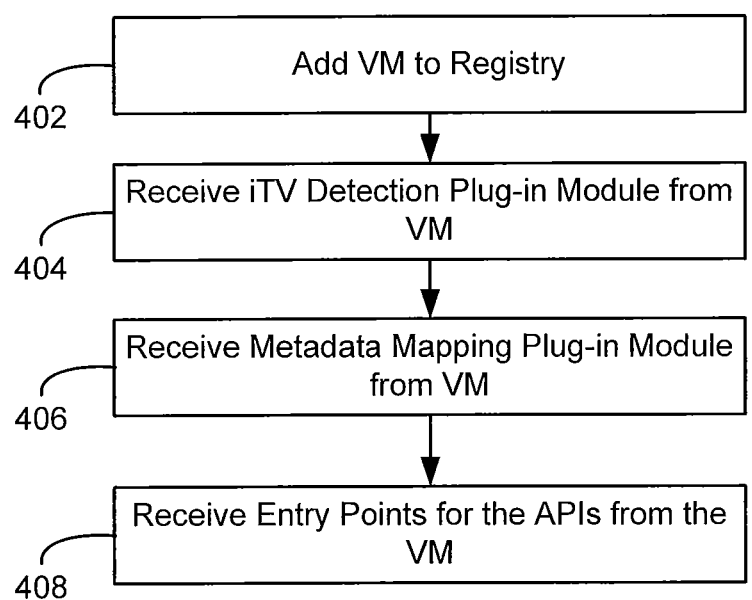
FIG. 4 depicts one embodiment of a process for registering a virtual machine.

FIG. 4 depicts one embodiment of a process 400 for registering an iTV VM 208. In one implementation, the iTV VM 208 is able to implement the interface for an iTV VM 208 as defined by a standard, examples of which have already been provided. However, the iTV VM 208 might also be a proprietary solution. Thus, it is not required that there be a published standard that defines requirements for the iTV VM interface. Process 400 may be performed by software in the personal computer 114(4). However, any other client 114 could also perform process 400. In one aspect, process 400 is performed by the iTV platform 202. In one implementation, the iTV platform 202 makes one or more registration methods available to assist in process 400. Process 400 starts when an iTV VM 208 invokes the method to register itself with the iTV platform 202. Registration typically is performed once on the client 114 for each iTV VM 208. In step 402, the iTV platform 202 adds a new iTV VM 208 to the iTV VM registry 215 in response to a request from the iTV VM 208.

In step 404, the iTV platform 202 receives an iTV detection plug-in 210 from the iTV VM 208. The iTV detection plug-in 210 is adapted to be able to determine whether the type of interactive TV that corresponds to the iTV VM 208 is within a broadcast data stream.

In step 406, the iTV platform 202 receives a metadata mapping plug-in 212 from the iTV VM 208. The metadata mapping plug-in 202 is responsible to identify which data streams in the broadcast digital stream are relevant to the particular iTV standard and need to be forwarded to the iTV VM 208. Similar to detecting the type of iTV that exists in the digital broadcast stream, identification of the type of streams needed for a specific iTV standard depends on the standard. Therefore, the iTV VM 208 should provide a specific mechanism (e.g., metadata mapping plug-in 212) to map the data within the broadcast digital stream to the iTV VM 208.

In step 408, the iTV platform 202 receives from the iTV VM 208 entry points for the APIs. As previously discussed, the entry points may define managed assembly (DLL) of an iTV VM 208 that support the interfaces needed for the Interactive TV platform 202 to load this iTV VM 208 and give the iTV VM 208 the Interactive TV Platform's 202 root interface.

Figure 5A:
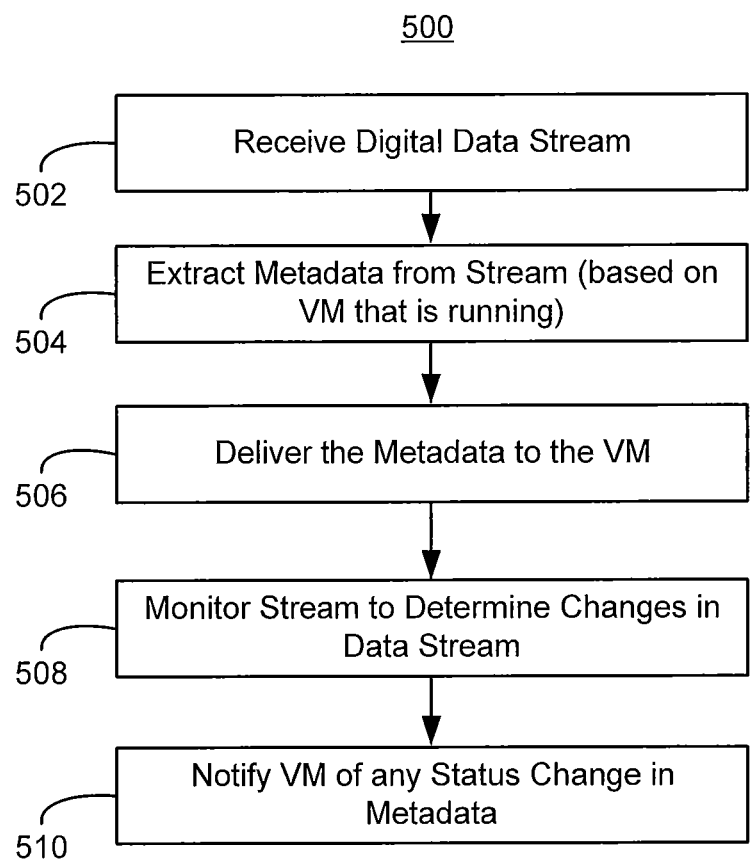
FIG. 5A depicts one embodiment of a process of providing data to a virtual machine.
Figure 5B:
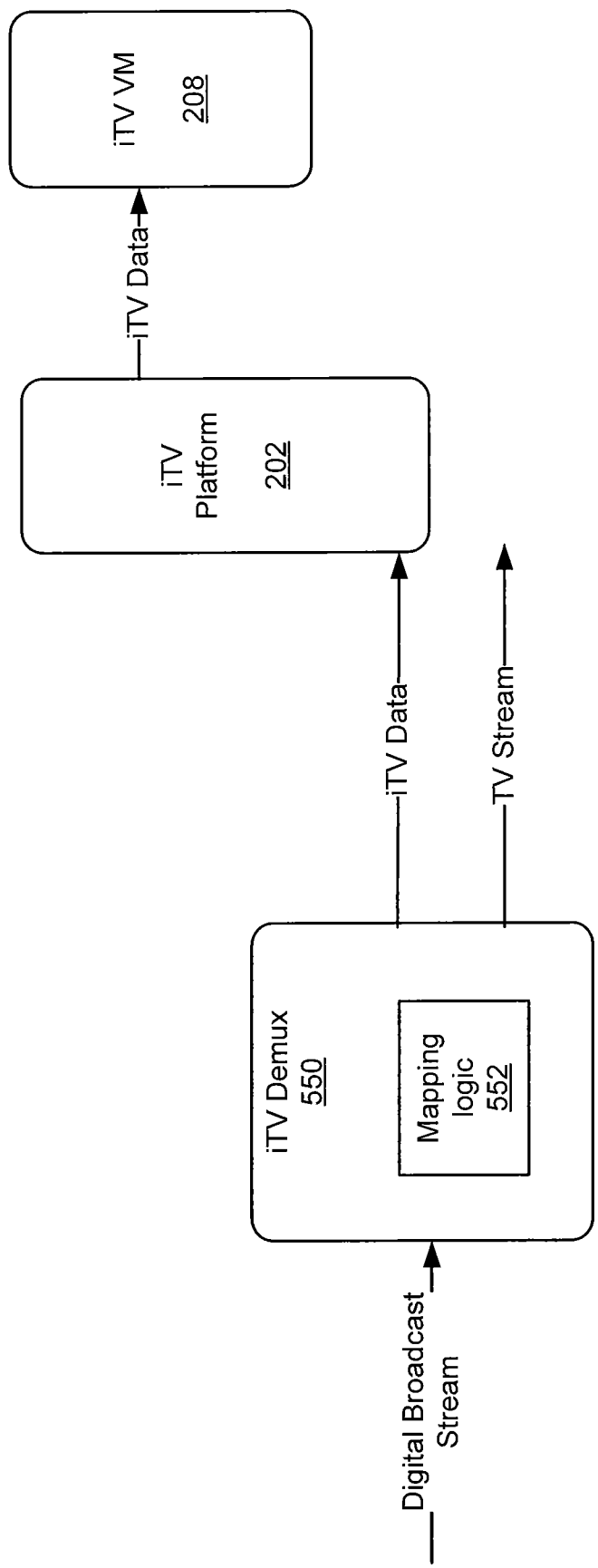
FIG. 5B illustrates data flow when providing data to a virtual machine.

FIG. 5A depicts one embodiment of a process 500 of providing iTV metadata to an iTV VM 208. Process 500 may be performed by software in the personal computer 114(4). However, any other client 114 could also perform process 500. In one aspect, process 500 is performed by the iTV platform 202. Reference will be made to FIG. 5B, which illustrates data flow when providing data to an iTV VM 208. In step 502, the client 114 receives a digital broadcast stream.

In FIG. 5B, the digital broadcast stream is depicted as being received by demultiplxer 550, which is a component (e.g., software) that analyzes the digital broadcast stream and separates it into various components. FIG. 5B illustrates the demultiplxer 550 separating the digital broadcast stream into a conventional TV stream and an interactive TV stream, which is provided to the iTV platform 202. In one implementation, the demultiplxer 550 has mapping logic 552 that is used to separate the digital broadcast stream into constituent parts and provide the constituent parts to the appropriate component. The iTV platform 202 provides and/or updates the mapping logic 552, in one implementation.

In step 504, the iTV platform 202 extracts metadata from the digital broadcast stream based on the iTV VM 208 that is currently running. In one embodiment, the iTV platform 202 uses the metadata mapping plug-in 212 that corresponds to the iTV VM 208 that is currently running. In step 506, the iTV platform 202 delivers the metadata to the iTV VM 208.

In step 508, the iTV platform 202 monitors the digital broadcast stream (using the metadata mapping plug-in 212) to determine whether there is any change to the digital broadcast stream. As an example, the iTV platform 202 monitors for a change in a program mapping table (PMT) within the stream. The metadata mapping plug-in 212 examines the PMT and provides the iTV Platform 202 a list of stream IDs of streams that should be delivered to an iTV VM 208. The iTV Platform 202 keeps track of the list, and when the list changes, the iTV Platform 202 updates the mapping logic 552 within the demultiplexer 550, which filters in/out individual streams out of overall broadcast steam based on a stream ID. Step 508 is not a required step. In one embodiment, the VM 208 performs some or all of the monitoring of the digital broadcast stream.

In step 510, the iTV platform 202 notifies the iTV VM 208 of any status changes in the metadata. For example, when a specific metadata steam is removed from the input digital broadcast stream, the iTV Platform 202 updates the mapping logic 552 in demultiplexer 550. As another example, when a metadata stream is added, the iTV platform 202 request the demultiplexer 550 to add to its mapping logic 552 and filter the new metadata stream to the iTV platform 202. The changes in the metadata streams are done by broadcaster and may happen in the middle of a broadcast, or due to channel change, etc. After the demultiplexer logic 550 is updated, the iTV platform 202 starts to receive this stream and forwards it to the iTV VM 208. Step 510 is not a required step. As previously noted, the VM 208 may perform some or all of the monitoring of the digital data stream.

For purposes of illustration, the following is an example of an API for implementing a generic tuning interface. This API can be used by multiple types of iTV VMs such as MHEG and BMI. This API can also be used by a proprietary iTV VM. This generic tuning interface allows an iTV VM 208 to issue the following types of requests to the interactive TV platform 202:

Receive a tuning object for a currently tuned channel.
Tune to different channels using predefined tuning object.
Tune to different channels using a user-specified tuning object, following a tuning scheme XML format.
Search for a tuning information according to low level MPEG/Digital TV stream parameters.
Search for tuning information by logical channel number.
Request a specific name/value pair from tuner device.
The following is an example of the tuning interface:

```
interface IiTvTuning : IUnknown
{
    HRESULT CurrentService( );
    HRESULT DoTuneRequest( );
    HRESULT DoPassThruTuneRequest( );
    HRESULT FindServiceFromId( );
    HRESULT FindServiceFromLCN( );
    HRESULT GetTunerProperty( );
};
```

The following describes the various methods available in the generic tuning interface. Note that the interface is suitable for consumption by an iTV VM 208 for both MHEG and BML. The interface is also suitable for consumption by an iTV VM 208 for proprietary iTV solutions. Further, the generic tuner interface can easily be extended for other types of iTV (e.g., MHP, OCAP, etc.) Similarly, interfaces can be defined for services other than tuning.

The "IiTvTuning CurrentService" method returns a tuning object (low level tuning information) for a currently tuned channel. This method can be used by both MHEG VMs 208 and BML VMs 208.

The "IiTvTuning.DoTuneRequest" method allows a VM 208 to tune to a channel defined by a tuning object. This method can be used by both MHEG and BML VMs 208.

The "IiTvTuning DoPassThruTuneRequest" method allows tuning to different channels using a string having a format understood by both VM and tuner, but not necessarily understood by the intermediate software layers. This method allows an iTV VM 208 to issue any kind of tuning request. In one implementation, this method is used by a proprietary iTV VM 208 that works on satellite networks. It may be possible for an iTV VM for MHEG and BML to use this method. However, some methods may not be used by a particular type of iTV VM 208.

The "IiTvTuning FindServiceFromId" method searches for a tuning information (e.g., a tuning object, which can be used in tuning operations) according to low level MPEG/ Digital TV stream parameters such as SID, TSID, NID, ONID, etc. This method may be used by an MHEG VM 208. However, BML VMs 208 do not necessarily need to use this method.

The "IiTvTuning.FindServiceFromLCN" method searches for tuning information (e.g., tuning object, which can be used in tuning operations) according to Logical Channel Number (LCN). This involves looking up into the downloaded program guide, which is transparent to the iTV VM. This method may be used by MHEG VMs 208. However, BML VMs 208 do not necessarily need to use this method.

The "IiTvTuning.GetTunerProperty" method requests a specific name/value pair (a property) from tuner device. A BML VM 208 may use this to obtain a BCAS-ID (a unique tuner/user identifier that is allocated by broadcaster and used by the iTV application running in iTV VM for applications where unique user identification is required—interactive votes, quizzes, etc). However, an MHEG VM 208 does not necessarily need to use this method.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

Figure 6:
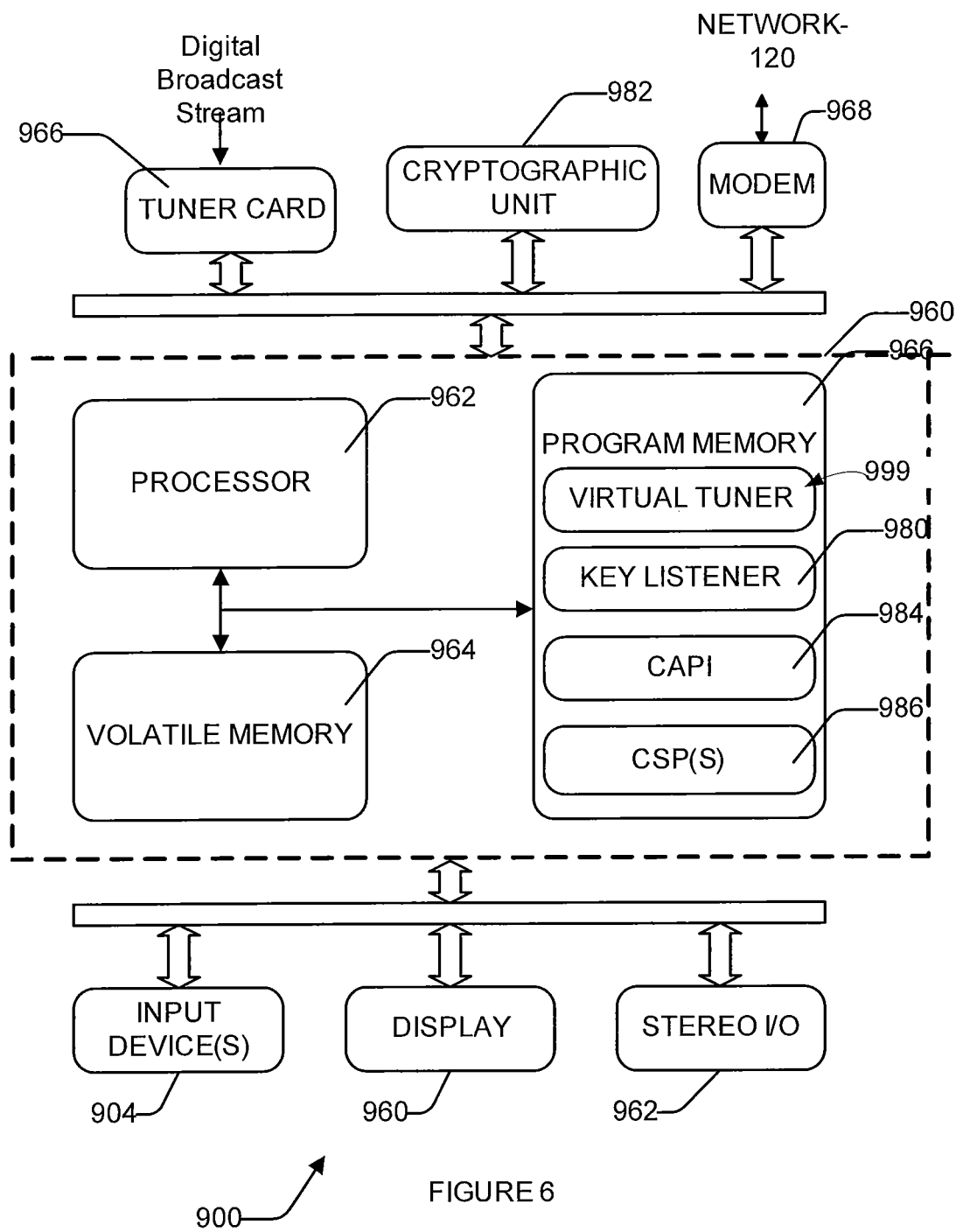
FIG. 6 shows an example configuration of a broadcast-enabled computer that serves as a platform for some embodiments of the present invention.

At least some of the embodiments disclosed herein may be implemented on client 114(4). FIG. 6 shows an example configuration of a broadcast-enabled electronic media device 900 that may serve to implement at least a portion of the client 114(4). Device 900 includes a central processing unit 960 having a processor 962, volatile memory 964 (e.g., RAM), and program memory 966 (e.g., ROM, Flash, disk drive, floppy disk drive, CD-ROM, etc.). The device 900 has one or more input devices 904 (e.g., keyboard, mouse, etc.), a video display 960 (e.g., VGA, SVGA), and a stereo I/O 972 for interfacing with a stereo system.

The device 900 has one or more tuners that tune to appropriate addresses on network 120 or frequencies not on the network 120. The tuner can be a tuner card coupled to the cable 117, antenna 124, or satellite dish 115. Alternatively, the tuner is a "virtual tuner" implemented in software that allows access to content server 104(4) through modem 968. The tuner card may be configured to receive either analog or digital data. For example, the tuner card can receive MPEG-encoded digital video and audio data, as well as data in many different forms, including software programs and programming information in the form of data files. The device 900 also has a modem 968, which provides dial-up access to the data network 120 to provide a back channel or direct link to the servers 104(4), 111. In other implementations of a back channel, the modem 968 might be replaced by a network card, or an RF receiver, or other type of port/receiver that provides access to the back channel.

The device 900 runs an operating system that supports multiple applications. The operating system may be a multitasking operating system that allows simultaneous execution of multiple applications. The operating system may employ a graphical user interface windowing environment that presents the applications or documents in specially delineated areas of the display screen called "windows."

The device is illustrated with a key listener 980 to receive authorization and session keys transmitted from the servers 104(4), 111, if necessary. The keys received by listener 980 are used by cryptographic security services implemented to enable decryption of the session keys and data. Cryptographic services are implemented through a combination of hardware and software. A secure, tamper-resistant hardware unit 982 is provided external to the CPU 960 and two software layers 984, 986 executing on the processor 962 are used to facilitate access to the resources on the cryptographic hardware 982.

The software layers include a cryptographic application program interface (CAPI) 984 that provides functionality to any application seeking cryptographic services (e.g., encryption, decryption, signing, or verification). One or more cryptographic service providers (CSPs) 986 implement the functionality presented by the CAPI to the application. The CAPI layer 984 selects the appropriate CSP for performing the requested cryptographic function. The CSPs 986 perform various cryptographic functions such as encryption key management, encryption/decryption services, hashing routines, digital signing, and authentication tasks in conjunction with the cryptographic unit 982. A different CSP might be configured to handle specific functions, such as encryption, decryption, signing, etc., although a single CSP can be implemented to handle them all. The CSPs 966 can be implemented as dynamic linked libraries (DLLs) that are loaded on demand by the CAPI, and which can then be called by an application through the CAPI 984.

Figure 7:
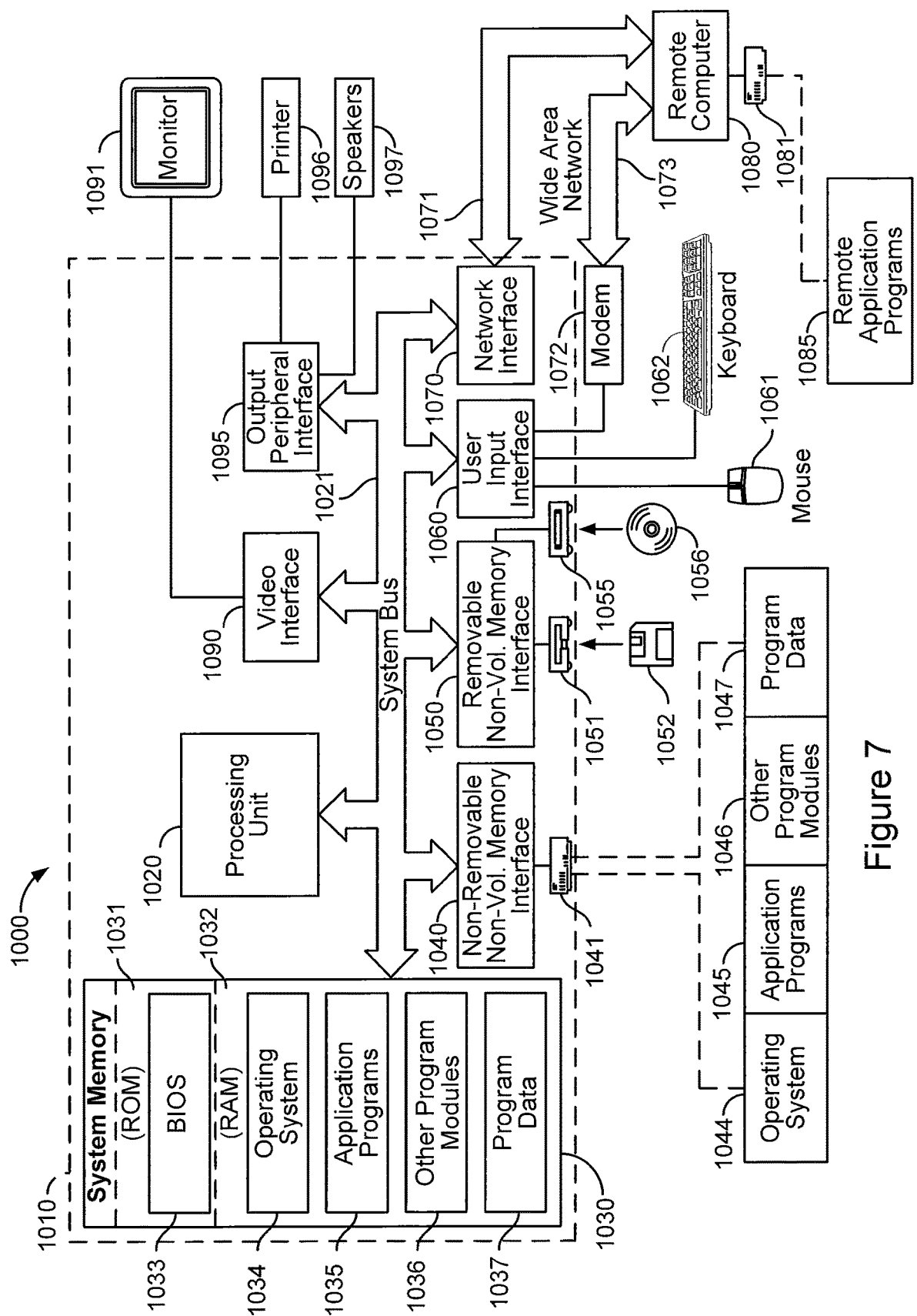
FIG. 7 is a block diagram for an embodiment of a computing environment for implementing the present technology.

FIG. 7 is a block diagram for an embodiment of a computing environment for implementing the present technology. In some embodiments, the computing environment of FIG. 7 may be used to implement client 114 of the system of FIG. 1.

Computing environment 1000 of FIG. 7 is only one example of a suitable computing environment and is not intended to suggest any limitation as to the scope of use or functionality of the technology herein. Neither should the computing environment 1000 be interpreted as having any dependency or requirement relating to any one or combination of components illustrated in the exemplary operating environment 1000.

With reference to FIG. 7, an exemplary system for implementing the technology herein includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 7 illustrates operating system 1034, application programs 1035, other program modules 1036, and program data 1037.

The computer 1010 may also include other removable/non-removable, volatile/nonvolatile computer storage media. By way of example only, FIG. 7 illustrates a hard disk drive 1040 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 7, provide storage of computer readable instructions, data structures, program modules and other data for the computer 1010. In FIG. 7, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 100 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1090.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 7. The logical connections depicted in FIG. 7 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 7 illustrates remote application programs 1085 as residing on memory device 1081. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for processing a received signal, comprising:
   receiving, from a content source, a digital stream comprising a first video signal for a media asset and a second video signal for the media asset;
   executing, using a processor, a plurality of detection components including a first detection component that retrieves from the digital stream a first signal type associated with the first video signal for the media asset and a second detection component that retrieves from the digital stream a second signal type associated with the second video signal for the media asset, wherein the first signal type is different from the second signal type;
   retrieving the first signal type from the first detection component and the second signal type from the second detection component respectively;
   identifying, using the processor, a first virtual machine associated with the first signal type and a second virtual machine associated with the second signal type, based on mapping logic indicating that the first virtual machine is associated with the first signal type and the second virtual machine is associated with the second signal type,
   wherein each of the first virtual machine and the second virtual machine is implemented according to a first standard and a second standard, respectively, wherein the first standard is different from the second standard;
   in response to identifying the first virtual machine, initializing the first virtual machine to generate a processed version of the first video signal;
   in response to identifying the second virtual machine, initializing the second virtual machine to generate a processed version of the second video signal;
   monitoring, using a metadata software component associated with the first signal type, the first video signal;

identifying a change to the first video signal, wherein a third signal type is associated with the first video signal;
in response to the change updating the mapping logic based on a program mapping table received in the first video signal and identify, using the processor, a third virtual machine associated with the third signal type,
in response to identifying the third virtual machine, initializing the third virtual machine to generate a processed version of the first video signal; and
generating for display the processed version of the first video signal and the processed version of the second video signal.

2. The method of claim 1, further comprising:
simultaneously generating for display the processed version of the first video signal and the processed version of the second video signal.

3. The method of claim 1, further comprising:
determining that the first video signal is no longer present in the digital stream; and
in response to determining that the first video signal is no longer present in the digital stream, shutting down the first virtual machine.

4. The method of claim 1, further comprising:
identifying, using the processor, a metadata software component associated with the first signal type;
executing, using the processor, the metadata software component to extract metadata from the first video signal; and
providing the metadata to the first virtual machine.

5. The method of claim 1, wherein the digital stream comprises a conventional television stream and a plurality of interactive television signals, and wherein the plurality of interactive television signals comprises the first video signal and the second video signal.

6. The method of claim 1, further comprising splitting, using a demultiplexer, the digital stream into the first video signal and the second video signal.

7. The method of claim 1, wherein each of the first standard and the second standard is one of Multimedia and Hypermedia Experts Group (MHEG), Broadcast Markup Language (BML), Multimedia Home Platform (MHP), or OpenCable Application Platform (OCAP).

8. A system for processing a received video signal, the system comprising:
communications circuitry configured to:
receive, from a content source, a digital stream comprising a first video signal for a media asset and a second video signal for the media asset;
transmit, to control circuitry, the digital stream comprising the first video signal and the second video signal;
storage circuitry configured to:
store mapping logic indicating that a first virtual machine is associated with a first signal type and a second virtual machine is associated with a second signal type;
transmit, to the control circuitry, the mapping logic indicating the first virtual machine associated with the first signal type and the second virtual machine associated with the second signal type;
the control circuitry configured to:
receive, from the communications circuitry, the digital stream comprising the first video signal and the second video signal;
execute a plurality of detection components including a first detection component that retrieves from the digital stream the first signal type associated with the first video signal for the media asset and a second detection component that retrieves from the digital stream the second signal type associated with the second video signal for the media asset, wherein the first signal type is different from second signal type;
retrieve the first signal type from the first detection component and the second signal type from the second detection component respectively;
receive, from the storage circuitry, the mapping logic indicating the first virtual machine associated with the first signal type and the second virtual machine associated with the second signal type;
identify the first virtual machine associated with the first signal type and the second virtual machine associated with the second signal type based on the mapping logic, wherein each of the first virtual machine and the second virtual machine is implemented according to a first standard and a second standard, respectively, wherein the first standard is different from the second standard;
in response to identifying the first virtual machine, initialize the first virtual machine to generate a processed version of the first video signal;
in response to identifying the second virtual machine, initialize the second virtual machine to generate a processed version of the second video signal;
monitor, using a metadata software component associated with the first signal type, the first video signal;
identify a change to the first video signal, wherein a third signal type is associated with the first video signal;
in response to the change update the mapping logic based on a program mapping table received in the first video signal and identify, using the processor, a third virtual machine associated with the third signal type,
in response to identifying the third virtual machine, initialize the third virtual machine to generate a processed version of the first video signal; and
generate for display the processed version of the first video signal and the processed version of the second video signal.

9. The system of claim 8, wherein the control circuitry is further configured to:
simultaneously generate for display, the first video signal and the second video signal.

10. The system of claim 8, further comprising:
determine that the first video signal is no longer present in the digital stream; and
in response to determining that the first video signal is no longer present, shut down the first virtual machine.

11. The system of claim 8, wherein the control circuitry is further configured to:
identify a metadata software component associated with the first signal type;
execute the metadata software component to extract metadata from the first video signal; and
provide the metadata to the first virtual machine.

12. The system of claim 8, wherein the digital stream comprises a conventional television stream and a plurality of interactive television signals, and wherein the plurality of interactive television signals comprises the first video signal and the second video signal.

13. The system of claim 8, wherein the control circuitry is further configured to:
monitor, using a metadata software component associated with the first signal type, the first video signal; and
identify a change to the first video signal.

14. The system of claim 8, wherein the control circuitry is further configured to:
   update the mapping logic based on a program mapping table received in the first video signal using the communications circuitry; and
   store, using the storage circuitry, the updated mapping logic.

15. The system of claim 8, wherein the control circuitry is further configured to split, using a demultiplexer, the digital stream into the first video signal and the second video signal.

16. The system of claim 8, wherein each of the first standard and the second standard is one of Multimedia and Hypermedia Experts Group (MHEG), Broadcast Markup Language (BML), Multimedia Home Platform (MHP), or OpenCable Application Platform (OCAP).

* * * * *